(12) United States Patent
Farges

(10) Patent No.: US 11,161,461 B2
(45) Date of Patent: Nov. 2, 2021

(54) VISUAL RECOGNITION SYSTEM OF A VEHICLE, AND A METHOD FOR IMPLEMENTING SUCH SYSTEM

(71) Applicant: Dura Operating, LLC, Auburn Hills, MI (US)

(72) Inventor: Thomas Farges, Gometz le Chatel (FR)

(73) Assignee: DURA Automotive Holdings U.K., LTD, Birmingham (GB)

( * ) Notice: Subject to any disclaimer, the term of this patent is extended or adjusted under 35 U.S.C. 154(b) by 0 days.

(21) Appl. No.: 16/216,435

(22) Filed: Dec. 11, 2018

(65) Prior Publication Data

US 2019/0184908 A1 Jun. 20, 2019

(30) Foreign Application Priority Data

Dec. 19, 2017 (EP) ..................................... 17208639

(51) Int. Cl.

| | |
|---|---|
| *G03B 17/08* | (2021.01) |
| *B60R 11/04* | (2006.01) |
| *H04N 5/225* | (2006.01) |
| *G05D 1/02* | (2020.01) |

(Continued)

(52) U.S. Cl.
CPC .............. *B60R 11/04* (2013.01); *G03B 17/08* (2013.01); *G05D 1/0246* (2013.01); *G06K 9/00369* (2013.01); *G06K 9/00791* (2013.01); *H04N 5/2252* (2013.01); *H04N 5/2254* (2013.01); *H04N 5/2257* (2013.01); *B60R 2011/004* (2013.01); *B60R 2011/0045* (2013.01); *G05D 2201/0213* (2013.01)

(58) Field of Classification Search
None
See application file for complete search history.

(56) References Cited

U.S. PATENT DOCUMENTS

| | | |
|---|---|---|
| 6,483,101 B1 | 11/2002 | Webster |
| 2006/0125919 A1 | 6/2006 | Camilleri et al. |

(Continued)

FOREIGN PATENT DOCUMENTS

| | | |
|---|---|---|
| JP | H0884277 A | 3/1996 |
| WO | WO2015168459 A1 | 11/2015 |

OTHER PUBLICATIONS

EP Extended Search Report for EP Application No. 17208639.9 dated Jun. 18, 2018, (7 pages).

*Primary Examiner* — Eileen M Adams
(74) *Attorney, Agent, or Firm* — Vivacqua Crane, PLLC

(57) ABSTRACT

A visual recognition system for a vehicle, comprising a plastic capping and an electronic module positioned near an internal face of the plastic capping; said electronic module comprising a sealed housing, a printed circuit board positioned inside the housing, and an optical sensor positioned inside the housing and connected to the printed circuit board; wherein the housing comprises at least one transparent part which is placed in front of the optical sensor and is transparent to visible light; wherein the plastic capping comprises at least one portion which forms a first optical lens placed in front of the optical sensor and the transparent part; and wherein the optical sensor is designed to capture an image outside the vehicle through the transparent part and the first optical lens. A method for implementing such system is also described.

9 Claims, 1 Drawing Sheet

(51) Int. Cl.
*G06K 9/00* (2006.01)
*B60R 11/00* (2006.01)

(56) References Cited

U.S. PATENT DOCUMENTS

| | | | |
|---|---|---|---|
| 2013/0215271 A1* | 8/2013 | Lu | H04N 7/18 |
| | | | 348/148 |
| 2016/0163217 A1* | 6/2016 | Harkness | G09B 5/06 |
| | | | 434/65 |
| 2016/0300410 A1 | 10/2016 | Jones et al. | |
| 2017/0138564 A1* | 5/2017 | Lmosdi | F21V 5/04 |
| 2017/0302829 A1* | 10/2017 | Mleczko | H04N 5/2257 |
| 2017/0329204 A1 | 11/2017 | Stern et al. | |
| 2017/0359520 A1 | 12/2017 | Boehm et al. | |
| 2019/0121051 A1* | 4/2019 | Byrne | G02B 7/021 |

* cited by examiner

VISUAL RECOGNITION SYSTEM OF A VEHICLE, AND A METHOD FOR IMPLEMENTING SUCH SYSTEM

CROSS REFERENCE TO RELATED APPLICATIONS

This application claims priority to European Patent Application No.: EP17208639.9 filed Dec. 19, 2017.

TECHNICAL FIELD

The disclosure concerns a visual recognition system for a vehicle. The disclosure also concerns a method for implementing such system.

BACKGROUND

It is known to equip vehicles, such as automotive vehicles, with video or still cameras. Said cameras generally include an optical lens used to focus light on an optical sensor that records the image by means of an integrated electronic card. Such system can be used for the visual recognition, which may include recording the vehicle surrounding for security reasons, for assisting the driver by identifying road signs, or even for providing an input to an automatic driving system of an autonomous vehicle.

US20160300410 describes an example of visual recognition system, wherein a camera is located on a side door of a vehicle to perform a facial recognition.

In such applications, a wide field of view is desirable. However, the existing wide-angle cameras are cumbersome, especially in axial direction of the lens, and difficult to package, which limits number of possible installation positions of the visual recognition system.

U.S. Pat. No. 6,483,101, US2017/329204 and US2006/125919 discloses other examples of optical systems.

The optical system of U.S. Pat. No. 6,483,101 is not designed for visual recognition and not designed for a vehicle. The system comprises a lens positioned in an aperture of a lens support, which is screwed into an electronic module. The lens support and the lens are distinct parts.

In another domain, WO2015168459 describes a keyless entry system that can be integrated with a vehicle trim component, such as a capping. The system comprises an electronic module that can be equipped with LED light source visible from the exterior via transparent parts of module housing and vehicle capping.

SUMMARY

An improved visual recognition system for a vehicle is disclosed. It aims at providing a system that is more compact and lighter than existing solutions while achieving high performance, notably in terms of field of vision covered by a single system.

To this end, portions of the disclosure relate to a visual recognition system for a vehicle, comprising a plastic capping and an electronic module positioned near an internal face of the plastic capping; said electronic module comprising a sealed housing, a printed circuit board positioned inside the housing, and an optical sensor positioned inside the housing and connected to the printed circuit board.

According to the disclosure, the housing comprises at least one transparent part which is placed in front of the optical sensor and is transparent to visible light. The plastic capping comprises at least one portion which forms a first optical lens placed in front of the optical sensor and the transparent part. The optical sensor is designed to capture an image outside the vehicle through the transparent part and the first optical lens.

In at least some implementations, there is no need to use a wide angle camera in the electronic module. Therefore the system can be more compact, lighter and give the designer more flexibility for choosing the system location on a vehicle body.

According to further aspects of the invention which are advantageous but not compulsory, such a system may incorporate one or several of the following features:

The first optical lens formed on the plastic capping is a wide-angle lens providing an angle of view larger than 120 degrees, preferably 150 degrees, more preferably 180 degrees.

The first optical lens is curved on the internal face of the plastic capping.

The transparent part of the housing forms a second optical lens placed between the optical sensor and the first optical lens.

The second optical lens is curved on both internal face and external face of the housing.

A third optical lens is placed inside the housing, between the optical sensor and the second optical lens.

The portion of the plastic capping forming the first optical lens is made of polymethylmethacrylate.

The disclosure also concerns a method for implementing a system as mentioned here-above, wherein the image captured by the optical sensor is used to perform a biometric analysis of a person located outside the vehicle.

The disclosure also concerns a method for implementing a system as mentioned here-above, wherein the image captured by the optical sensor is used as an input for an autonomous driving system of the vehicle.

DESCRIPTION OF THE DRAWINGS

Certain embodiments will now be explained in correspondence with the annexed figures, and as an illustrative example, without restricting the object of the invention. In the annexed figures.

DETAILED DESCRIPTION

Figure 1:
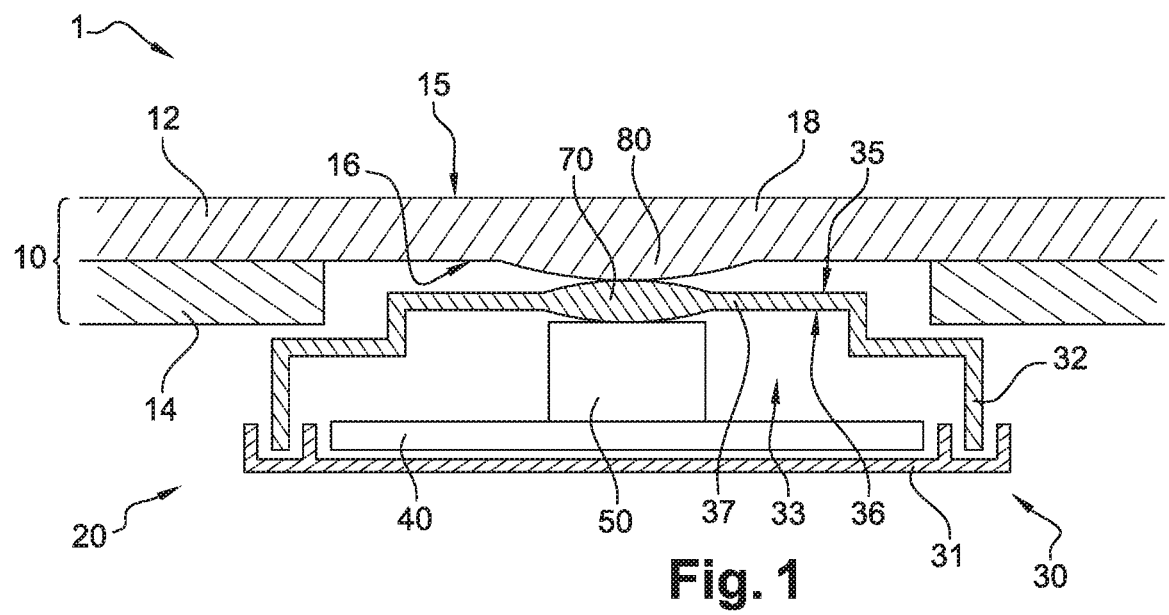
FIG. 1 is a sectional view of a visual recognition system according to a first embodiment, comprising two cooperating lenses.

FIG. 1 shows a first embodiment of a visual recognition system 1 for equipping a vehicle.

System 1 comprises a plastic capping 10 that is part of the vehicle body. Capping 10 may comprise two layers: an external layer 12 made of PMMA (poly(methyl methacrylate)) and an internal layer 14 made of ABS (Acrylonitrile butadiene styrene). In this embodiment, the whole external layer 12 is transparent to visible light. Layer 12 has an external face 15 and an internal face 16.

System 1 further includes an electronic module 20 positioned near the internal face 16 of capping 10. Module 20 comprises a sealed housing 30, a printed circuit board (PCB) 40 positioned inside housing 30, and an optical sensor 50 positioned inside housing 30 and connected to PCB 40. For example, sensor 50 can be connected to PCB 40 by soldering. Alternatively, sensor 50 may be placed into a dedicated socket of PCB 40.

PCB 40 powers sensor 50 and transmits its output to other vehicle components, such as an Electronic Control Unit (not represented).

Housing 30 is composed of a non-transparent bottom part 31 and a transparent upper part 32 delimiting an inner space 33, where PCB 40 and sensor 50 are disposed. Part 32 may be entirely transparent or, alternatively, it may include a transparent part 37 while being non-transparent elsewhere. Part 32 has an external face 35 facing the internal face 16 of layer 12 and an internal face 36 facing sensor 50.

Capping 10 comprises one portion 18 of layer 12 which forms a first optical lens 80, placed in front of the optical sensor 50 and the transparent part 37 of housing 30. Lens 80 is formed by a domed shape of transparent material. Layer 14 has an aperture formed between portion 18 and module 20, so that capping 10 only includes the transparent layer 12 in the region of lens 80. Portion 18 is formed integral with layer 12. In other words, layer 12 and portion 18 are not distinct parts.

In a further embodiment, the optical lens 80 is curved only on the internal face 16 of capping 10. This configuration permits to obtain a smooth external appearance, which is desirable for aesthetic and aerodynamic reasons. Furthermore, it may be desirable to make the visual recognition system 1 invisible from the outside of the vehicle, for example when it is used as a part of an anti-theft system.

According to a non-preferred but still useful embodiment, optical lens 80 can be curved on both faces 15 and 16.

In the embodiment illustrated in FIG. 1, system 1 includes further a second optical lens 70 which is formed by a curvature of the transparent part 37 of the housing 30. Lens 70 is disposed between the sensor 50 and the lens 80. Lens 70 is curved on both internal face 35 and external face 36 of housing 30. Alternatively, lens 70 can be curved only on one face 35 or 36. In the illustrated embodiment, both lenses 70 and 80 are convex. Alternatively, one or both of them can be concave, without departing from the scope of the invention.

The optical sensor 50 is designed to capture an image outside the vehicle through the transparent part 37 of housing 30, lens 70 and lens 80. Captured images can be used as a security footage of the vehicle surroundings, or to perform a biometric analysis of a person outside of the vehicle. Alternatively or additionally, the images can be used as an input for a driver assistance system or as an input for the autonomous driving system of the vehicle.

System 1 may have a wide-angle capture capacity, known also as a "fish-eye". Therefore the angle of view of system 1 is larger than 120 degrees, preferably 150 degrees, more preferably 180 degrees. In such a manner, if the visual recognition is used for a biometric identification of a person approaching the vehicle, only one visual recognition system 1 is required per side of the vehicle to grant driver and passengers access to the vehicle.

Obtaining such wide-angle is made easier by the combination of lenses 70 and 80.

Figure 2:
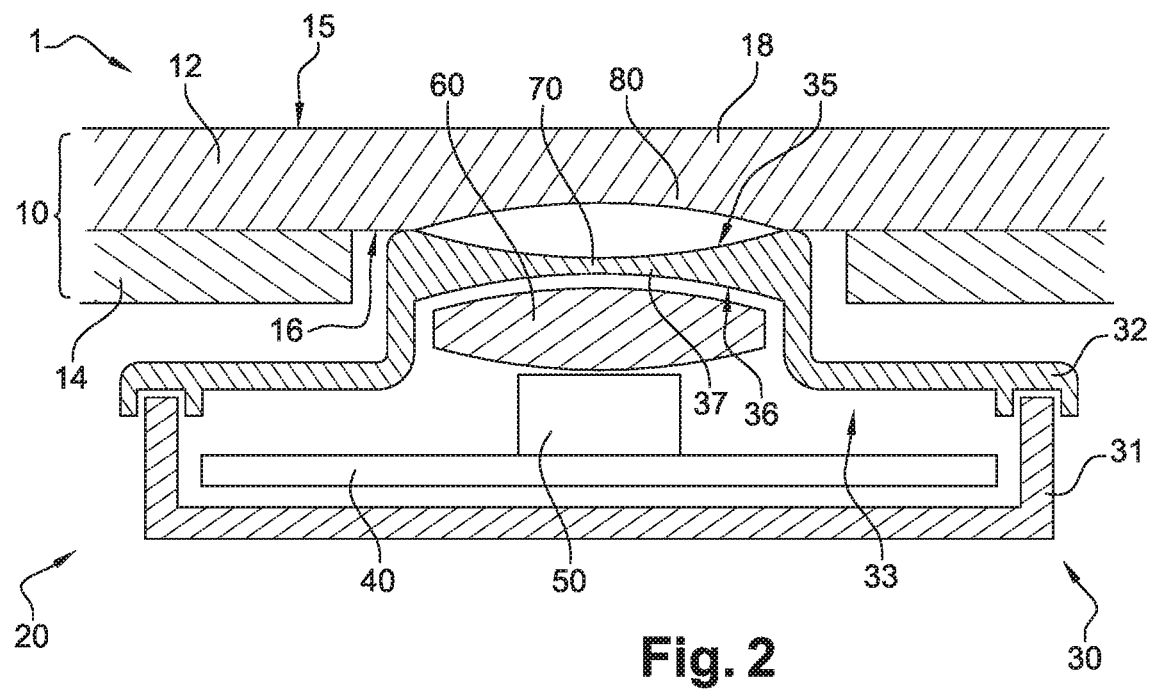
FIG. 2 is a sectional view of a system according to a second embodiment, comprising three cooperating lenses.

FIG. 2 shows a second embodiment of a visual recognition system 1. In this embodiment, elements similar to the first embodiment have the same references and work in the same way. Only the differences with respect to the first embodiment are described hereafter.

In the embodiment illustrated on FIG. 2, system 1 further comprises a third optical lens 60 placed inside housing 30, between sensor 50 and lens 70. In other words, the optical sensor 50 registers image focused by the cooperating optical lenses 60, 70 and 80 placed in series.

According to a particular form, lenses 70, 80 are concave while lens 60 is convex.

Other non-shown embodiments can be implemented within the scope of the invention.

In particular, lenses 60, 70 and 80 can have other shapes. For example, lens 60 can be concave.

According to another non-shown embodiment, capping 10 may be composed of a single portion of PMMA in front of module 20 and portions of ABS in other regions.

Technical features of the different embodiments can be, in whole or part, combined with each other. Thus, system 1 can be adapted to the specific requirements of the application.

The invention claimed is:

1. A visual recognition system for a vehicle, comprising a plastic capping and an electronic module positioned near an internal face of the plastic capping; said electronic module comprising a sealed housing, a printed circuit board positioned inside the sealed housing, and an optical sensor positioned inside the sealed housing and connected to the printed circuit board;
   wherein the sealed housing comprises at least one transparent part which is placed in front of the optical sensor and is transparent to visible light;
   wherein the plastic capping comprises at least one portion which forms a first optical lens placed in front of the optical sensor and in front of the transparent part; and
   wherein the optical sensor is designed to capture an image outside the vehicle through the transparent part and the first optical lens.

2. The system according to claim 1, wherein the first optical lens formed on the plastic capping is a wide-angle lens providing an angle of view larger than 120 degrees.

3. The system according to claim 1, wherein the first optical lens is curved on the internal face of the plastic capping.

4. The system according to claim 1, wherein the transparent part of the sealed housing forms a second optical lens between the optical sensor and the first optical lens.

5. The system according to claim 4, wherein the second optical lens is curved on both internal face and external face of the sealed housing.

6. The system according to claim 4, wherein a third optical lens is placed inside the sealed housing, between the optical sensor and the second optical lens.

7. The system according to claim 1, wherein the portion of the plastic capping forming the first optical lens is made of polymethylmethacrylate.

8. A method for implementing the system according to claim 1, wherein the image captured by the optical sensor is used to perform a biometric analysis of a person located outside the vehicle.

9. A method for implementing the system according to claim 1, wherein the image captured by the optical sensor is used as an input for an autonomous driving system of the vehicle.

* * * * *